United States Patent

Mizumoto

Patent Number: 5,814,962
Date of Patent: Sep. 29, 1998

[54] SERVO CONTROLLER

[75] Inventor: Kenji Mizumoto, Osaka, Japan

[73] Assignee: Minolta Co., Ltd., Osaka, Japan

[21] Appl. No.: 659,456

[22] Filed: Jun. 6, 1996

[30] Foreign Application Priority Data

Jun. 8, 1995 [JP] Japan ................................ 7-141703

[51] Int. Cl.⁶ .................................................. G05B 19/29
[52] U.S. Cl. ..................... 310/600; 318/560; 318/561; 318/254; 318/138; 318/439; 318/814; 318/693; 318/671; 318/652; 318/632; 318/568.22
[58] Field of Search ................................. 318/560, 561, 318/600, 254, 138, 439, 568.22, 632, 652, 671, 693, 814

[56] References Cited

U.S. PATENT DOCUMENTS

| | | | |
|---|---|---|---|
| 3,844,196 | 10/1974 | Taylor et al. | 318/254 X |
| 5,001,770 | 3/1991 | Losic et al. | 318/254 X |
| 5,182,685 | 1/1993 | Krause et al. | 318/560 X |
| 5,315,219 | 5/1994 | Kishi | 318/254 |
| 5,495,161 | 2/1996 | Hunter | 318/254 X |
| 5,612,602 | 3/1997 | Kubota et al. | 318/560 |

OTHER PUBLICATIONS

Tanaka and Yoshida, "Active Servo Technology", Oct. 1990, Japanese Publication: Yamaha YST–SW 1000 Super Woofer Tone Quality, pp. 1–3,—Radio Technology—p. 91.

Primary Examiner—Karen Masih
Attorney, Agent, or Firm—McDermott, Will & Emery

[57] ABSTRACT

A servo controller for servo-controlling an operative device, the servo controller is provided with an actuator having a motor for actuating the operative device; a sensor for detecting an operational state of the operative device; a comparator for receiving a detected operational state of the operative device from the sensor and comparing the detected operational state with a target operational state to produce a control signal; and a driver provided between the actuator and the comparator for driving the actuator in accordance with the control signal, the driver including a negative impedance circuit with respect to the actuator.

14 Claims, 5 Drawing Sheets

SERVO CONTROLLER

BACKGROUND OF THE INVENTION

This invention relates to a servo controller which servo-controls an actuator by transmitting an input signal to the actuator via a comparator and negatively feeding an output of a load driven by the actuator back to the comparator.

Generally, a servo controller includes a comparator, a regulator, a driver, an actuator, and an operative device as well as a sensor for detecting an output of the operative device and feeding it back to the comparator. The actuator has a motor. The servo control is such that the speed and position of the operative device are detected by the sensor; actual speed and position of the operative device are compared with target speed and position represented by an input by the comparator; and the regulator and the driver drive the actuator so as to approximate a deviation from the input V to zero. It is a so-called negative feedback control. The servo controller is so designed as to perform a stable control to the load or against its variation or disturbances, and to perform a suitable control in accordance with a feedback amount.

FIG. 4 is a block diagram showing in detail a total transfer function of the driver, the actuator and the operative device in the case of using a DC (Direct Current) motor in the actuator. An angle transfer function G hd θ1viewed from the driver is expressed in Equation (1) below. It should be appreciated that the driver is of voltage drive system having a gain of $A_1$.

$$G_{\theta 1} = \frac{\theta}{V_1} = \frac{1}{s} \cdot \frac{KtA_1}{s^2 JL + s(JR + \mu L) + \mu R + KeKt} \quad (1)$$

Where s: Laplace operand

J: a total of moments of inertia of the DC motor and the load $\mu$: a total of coefficients of viscous friction of the DC motor and the load L: inductance of an DC motor armature $K_e$: coefficient of counterelectromotive force $K_t$: torque constant $A_1$: voltage gain of the driver R: A direct-current resistance of the DC motor armature If $T_L$ denotes the load, its variation and disturbances viewed from the DC motor, its output angle θ is expressed as in Equation (2):

$$\begin{aligned}\theta &= \frac{1}{s} \cdot \frac{kTA_1}{s^2 JL + s(JR + \mu L) + \mu R + KeKt} V_t + \\ &\quad \frac{1}{s} \cdot \frac{R + sL}{s^2 JL + s(JR + \mu L) + \mu R + KeKt} T_L \\ &= G_{\theta 1} \cdot V_1 + G_{\theta TL1} \cdot T_L \\ &= \theta_{V1} + \theta_{TL}\end{aligned} \quad (2)$$

FIG. 5 shows a portion of the actuator in the terms of transfer function. A component ratio K of the first to second terms is expressed as in Equation (3):

$$K = \frac{\theta_{TL}}{\theta_{V1}} = \frac{R + sL}{KtA_1} \cdot \frac{T_L}{V_1} \quad (3)$$

In such a servo control, the load acts to improve the stability of a control characteristic against its variation and the disturbances, and a suitable control is performed in accordance with a feedback amount. As a characteristic of the regulator is known a combination of a proportional control (P-control), an integral control (I-control) and a derivative control (D-control) according to the purpose.

On the other hand, another known servo controller adopts an electronic governor drive system in order to drive the DC motor at a fixed speed. There is also known a loudspeaker which can be driven by a signal source via a negative impedance circuit ("Active Servo Technology", Page 91 of "RADIO TECHNOLOGY" issued in October, 1990).

However, in the block diagram of FIG. 4, since $\mu$, i.e., a total of coefficients of viscous friction of the DC motor and the load, is in a constant part ($\mu$R+KeKt) of a denominator as defined in Equation (2), the response of the servo controller is influenced if the frequency components of the input signal $V_1$, and the disturbance TL lie in a low frequency region, that is s≈0. Further, since the armature resistance R of the DC motor as the actuator 5 remains in a numerator (R+sL) of the component ratio K defined in Equation (3), that is sL≈0, the influence of the disturbance cannot be suppressed. Even if a combination of known P-control, I-control and D-control is incorporated into such a system, there is a limit in regulating the feedback amount.

On the other hand, the aforementioned governor drive system is merely designed to drive the DC motor, and is not adopted by the servo controller for controlling a feedback. Likewise, the loudspeaker drive technique using the negative impedance circuit effects an open-loop control, but not a feedback control. Accordingly, the latter two prior art systems do not consider a variety of conditions required to be met when a negative feedback control is effected.

SUMMARY OF THE INVENTION

It is an object of the present invention to provide a servo controller which has overcome the problems residing in the prior art.

It is another object of the present invention to provide a servo controller which has better response to inputs, stability, resistance to disturbances or the like, and improved linearity.

The present invention provides a servo controller for controlling an operative device. The servo controller includes an actuator, a sensor, a comparator, and a driver. The actuator includes a motor that drives the operative device. The sensor detects the state in which the operational device is functioning, and provides a signal indicative of that state to the comparator. The comparator compares the detected state of the operational device with a target state and produces a resulting control signal. The driver is provided between the actuator and the comparator, and includes a negative impedance circuit with respect to the actuator. The driver drives the actuator in accordance with the control signal received from the comparator.

It may be preferable o set a negative impedance $Z_0$ of the negative impedance circuit so as to follow the following equation:

$$Z_0 + R \approx 0$$

where R denotes a resistance of the motor.

The motor may be a direct current (DC) motor. In this case, the driver may be made to output a drive signal Vo defined by the following equation:

$$V_0 = \frac{1}{s} \cdot \frac{KtA_1}{s^2 JL + s\mu L + KeKt} V_1 + \frac{1}{s} \cdot \frac{sL}{s^2 JL + s\mu L + KeKt} T_L$$

Where V1: the control signal from the comparator;

s: Laplace operand

J: a total of moments of inertia of the DC motor and a load

μ: a total of coefficients of viscous friction of the DC motor and the load

L: inductance of an DC motor armature $K_e$: coefficient of counterelectromotive force $K_t$: torque constant $A_1$: voltage gain of the driver.

In an alternative embodiment, the present invention provides a servo controller for controlling an operative device. The servo controller includes an actuator, a driver, a sensor, a comparator, and a regulator. The actuator controls the functioning of the operative device. The driver includes a negative impedance circuit with respect to the actuator, and generates a drive signal that controls the actuator. The sensor detects the state in which the operational device is functioning, and provides a signal indicative of that state to the comparator. The comparator compares the detected state of the operational device with a target state. The regulator then generates a control signal in accordance with the result of the comparison between the detected state and the target state, and provides that control signal to the driver.

It may be appreciated that the sensor detects an operational speed and an operational position of the operative device and the target signal is indicative of a target speed and a target position of the operative device.

The regulator may be made to generate a control signal to cause a difference between a detection signal from the sensor and the target signal to be zero.

The operative device may be provided with a transmission mechanism and a driven member to be driven. The transmission mechanism transmits a drive force from the motor to the driven member. Also, the transmission mechanism may be provided with a gear system and the driven member includes a taking lens.

With the thus constructed servo controller, the driver arranged between the actuator and the comparator is provided with a negative impedance circuit with respect to the actuator. This will assure better response to inputs, stability, resistance to disturbances. Also, this will improve linearity.

These and other objects, features and advantages of the present invention will become more apparent upon a reading of the following detailed description and accompanying drawings.

DETAILED DESCRIPTION OF THE PREFERRED EMBODIMENT OF THE INVENTION

Figure 1:
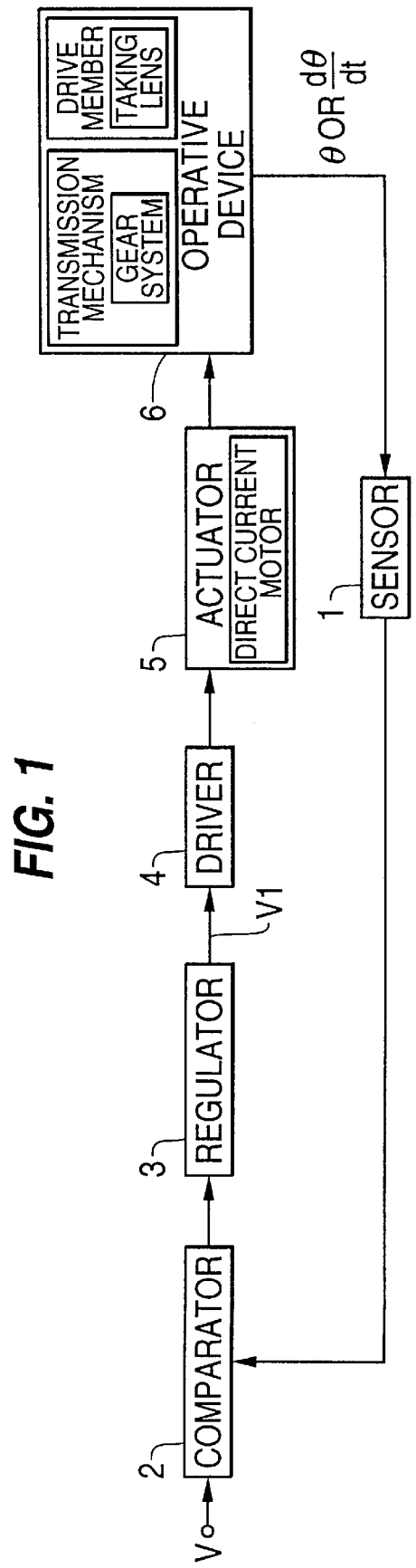
FIG. 1 is a basic block diagram showing an overall construction of a servo controller embodying the present invention.

FIG. 1 is a basic block diagram showing an overall construction of a servo controller embodying the present invention. The basic construction of the servo controller includes a comparator 2, a regulator 3, a driver 4, an actuator 5, an operative device 6, and a sensor 1 for detecting an output of the operative device 6 and feeding the detected output back to the comparator 2. The servo controller controls the speed and position of the actuator 5.

The driver 4 has a gain $A_1$, generates a voltage or current corresponding to an input signal or control signal from the regulator 3 and supplies a drive signal to the actuator 5. The driver 4 is shown in detail in FIG. 2. The actuator 5 is provided with a DC motor, e.g., a voice coil motor (VCM) of rotational output type. The operative device 6, giving a load to the actuator 5, includes a transmission mechanism and members to be driven. For example, in the case that the servo controller is used to drive a lens to correct a camera shake during photographing under a high control performance in aspect of response and stability, the transmission mechanism includes a gear system and the driven members includes a taking lens. To detect an operational speed and position of the operative device 6, the sensor 1 includes a potentiometer, rotary encoder or like proximity sensor coupled with the operative device 6 or directly with the actuator 5.

In the servo controller, the following operations are performed. The sensor 1 detects an operational speed and position of the operative device 6. The comparator 2 compares a detected speed and position of the operative device 6, which is represented by an output signal of the sensor 1, with a target speed and position represented by a control input signal V. The regulator 3 and the driver 4 drive the actuator 5 so as to approximate the deviation of the output signal from the input signal (hereinafter, "input deviation") to zero. In other words, the servo controller adopts a so-called negative feedback control.

The regulator 3 designs transfer function to determine and improve many of servo control characteristics using Proportion Control or P-control, Integration Control or I-control, Differential Control or D-control or a combination of these controls.

In the P-control, a transfer function has a flat characteristic and outputs a signal representing a multiple of the input deviation by a constant (×a). As servo control characteristics, the larger the constant a, the more advantages there are: the input deviation can be made smaller, a frequency response characteristic and quick response are improved since the feedback amount will increase. In the I-control, since the transfer function has an integral characteristic, when the input deviation is a direct current, the feedback amount is large. Accordingly, as servo characteristics, there is an advantage that a normal input deviation (direct-current offset) can be made smaller. If the constant a is set excessively large so as to improve the quick response in the P-control, overshooting and ringing occurs in a step response (vibrational response) or even oscillation may occur. This is because a loop gain of the servo control (a loop transfer function from the sensor 1 to the operative device 6) cannot ignore a phase of the transfer function as the frequency of the control input signal V increases, and a servo control transfer function (closed loop gain) comes to have an element of oscillation. In order to avoid this phenomenon, the regulator 3 is caused to have a derivative characteristic to advance the phase to cancel the phase delay.

The control characteristics of the servo controller has an improved stability against the load, the variation of the load or the disturbances. Accordingly, the servo controller can perform a suitable control according to the feedback amount. Here, the load, the variation of the load and the disturbances refer to a mechanical friction resulting from the construction and assemblage of the actuator 5 and a movable member of the operative device 6, and vibration and external force exerted from outside. They are collectively identified by $T_L$.

Figure 2:
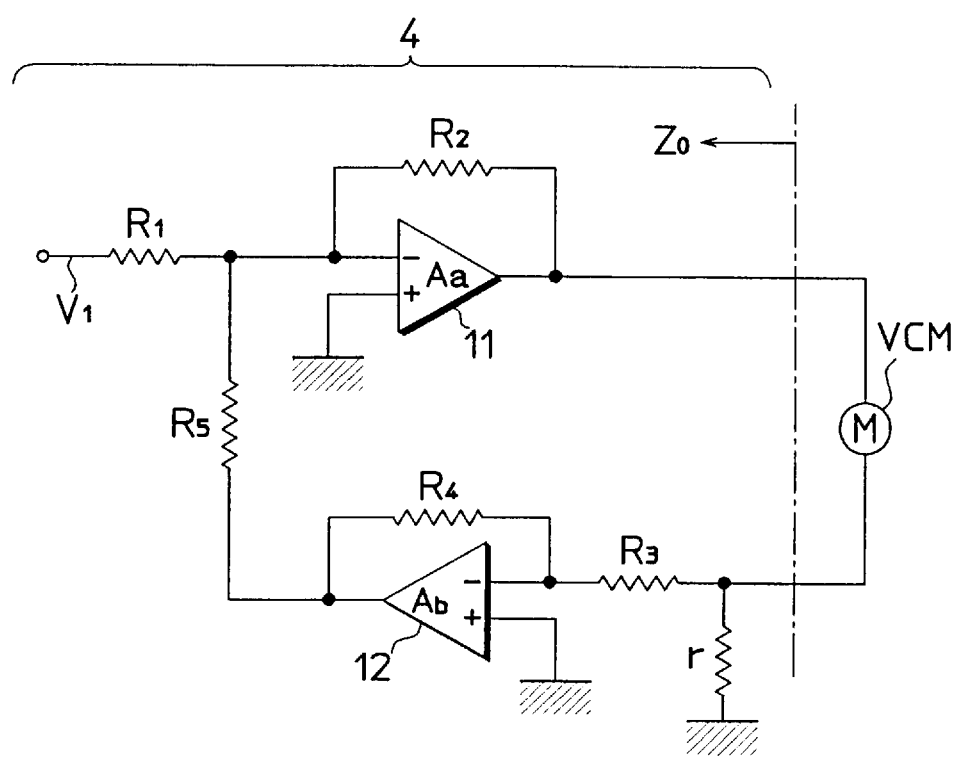
FIG. 2 is a circuit diagram showing a construction of a driver of the servo controller, the driver using a negative impedance circuit.

FIG. 2 is a circuit diagram showing a construction of the driver 4 using a negative impedance circuit. In FIG. 2, the driver 4 includes inverted amplifiers 11, 12 connected in a loop via the actuator 5 provided with the voice coil motor. $A_a$ and $A_b$ denote a gain of the inverted amplifier 11 and a gain of the inverted amplifier 12, respectively. Non-inverted input terminals of the inverted amplifiers 11, 12 are grounded. An inverted input terminal of the inverted amplifier 11 is connected with an input side via a resistor $R_1$, and also with an output terminal of the inverted amplifier 12 via a resistor $R_5$. A resistor R2 is disposed between the non-inverted input terminal and output terminal of the inverted amplifier 11, and the output terminal of the inverted amplifier 11 is connected with one end of the voice coil motor.

The other end of the voice coil motor is grounded via a resistor r and also with an inverted input terminal of the inverted amplifier 12 via a resistor $R_3$. A resistor $R_4$ is disposed between the inverted input terminal and the output terminal of the inverted amplifier 12.

In the driver 4, $A_a<<-(R_1+R_2)R_1$ and $A_a<<-(R_5+R_2)/R_5$, and $A_b<<-(R_3+R_4)/R_3$. At this time, $A_1=-R_2/R_1$, $A_2=-R_4/R_3$, $A_3=-R_2/R_5$ where $R_3>>r$.

On the other hand, if $Z_0$ denotes an impedance when the driver 4 is viewed from the voice coil motor, $Z_0$ is expressed as in Equation (5).

$$Z_0 = r(1-A_2 A_3) \quad (5)$$

If $A_2 \cdot A_3 >> 1$, Equation (5) is rewritten into Equation (6).

$$Z_0 \approx -r A_2 A_3 < 0 \quad (6)$$

An output angle θ in the case that the voice coil motor is connected with a circuit having such a negative impedance $Z_0$ is expressed as in Equation (7):

$$\theta = \frac{1}{s} \cdot \frac{KtA_1}{s^2 JL + s\{J(R+Z_0) + \mu L\} + \mu(R+Z_0) + KeKt} V_t + \frac{1}{s} \cdot \frac{R + Z_0 + sL}{s^2 JL + s\{J(R+Z_0) + \mu L\} + \mu(R+Z_0) + KeKt} T_L$$

$$= G_\theta \cdot V_1 + G_{\theta TL} \cdot T_L \quad (7)$$

and a component ratio K of a first term to a second term is expressed as in Equation (8):

$$K = \frac{R + Z_0 + sL}{KtA_1} \cdot \frac{T_L}{V_1} \quad (8)$$

If the impedance $Z_0$ is set in relation to an armature resistance R of the voice coil motor such that $Z_0 + R = 0$, Equations (7) and (8) can be rewritten into Equations (9) and (10), respectively.

$$\theta = \frac{1}{s} \cdot \frac{KtA_1}{s^2 JL + s\mu L + KeKt} V_1 + \frac{1}{s} \cdot \frac{sL}{s^2 JL + s\mu L + KeKt} T_L$$

$$= G_{\theta 2} \cdot V_1 + G_{\theta TL2} \cdot T_L \quad (9)$$

$$K = \frac{sL}{KtA_1} \cdot \frac{T_L}{V_1} \quad (10)$$

Figure 3:
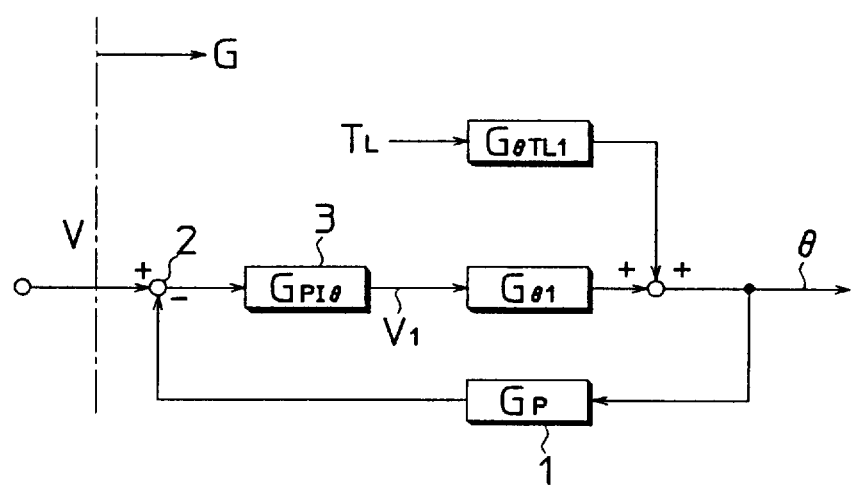
FIG. 3 is a block diagram showing the overall construction of the servo controller in the terms of transfer function.
Figure 4:
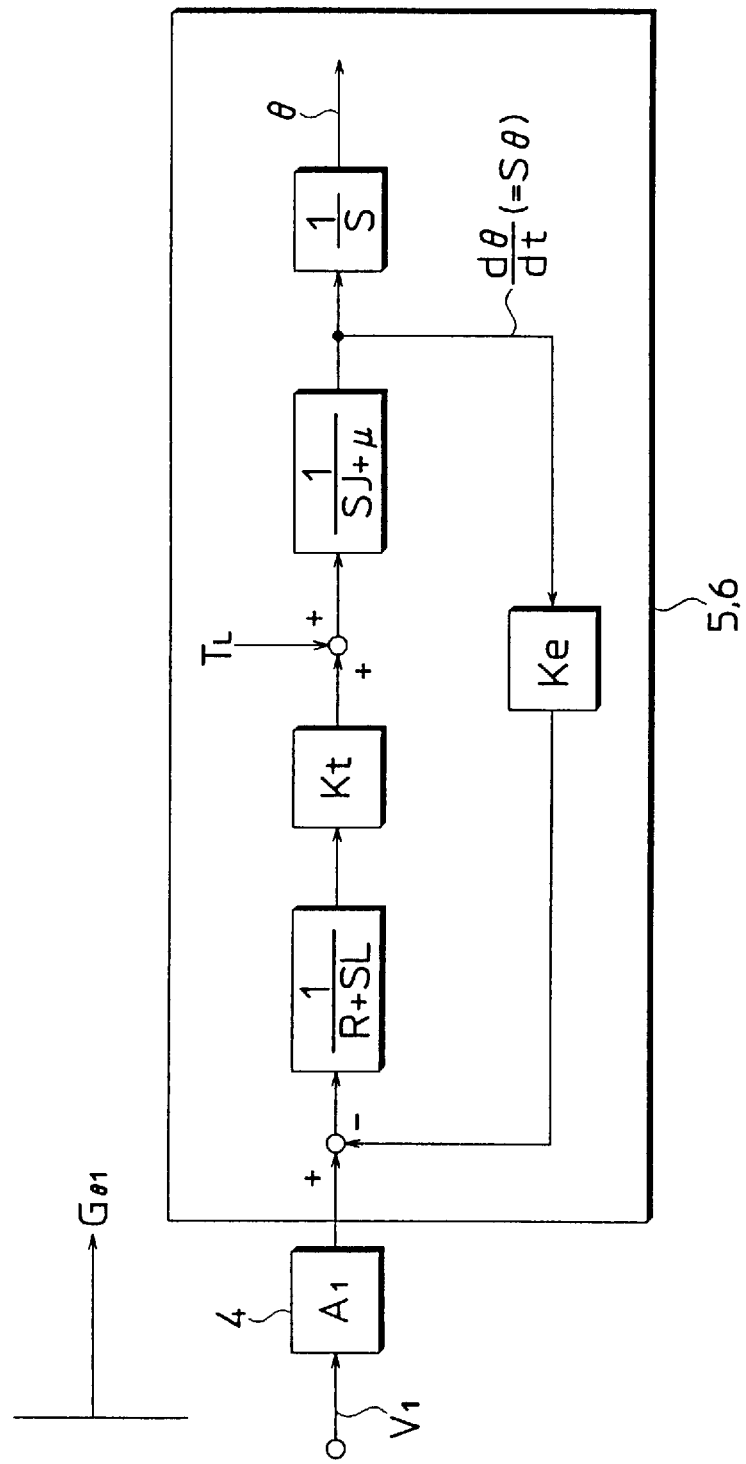
FIG. 4 is a block diagram showing a total transfer function from a driver to an operative device in details.
Figure 5:
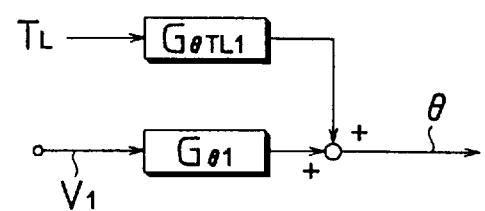
FIG. 5 is a block diagram showing a portion of an actuator in the terms of transfer function.

FIG. 3 is a block diagram showing the overall construction of the servo controller in the terms of transfer function, wherein G denotes a servo control transfer function. This servo control transfer function G is defined as in Equation (11):

$$G = \frac{G_{PID} \cdot G_{\theta 1}}{1 + G_{PID} \cdot G_{\theta 1} \cdot G_P} \quad (11)$$

where $G_{PID}$ denotes a transfer function of the regulator 3, $G_P$ denotes an angle-voltage conversion voltage function of the sensor 1, and $G_{PID}$, $G_{\theta 1}$, and $G_P$ are loop gain voltage functions.

Its output angle θ and the component ratio K are expressed as in Equations (12) and (13), respectively:

$$\theta = \frac{G_{PID} \cdot G_{\theta 1}}{1 + G_{PID} \cdot G_{\theta 1} \cdot G_P} V + \frac{G_{\theta TL1}}{1 + G_{PID} \cdot G_{\theta 1} \cdot G_P} T_L \quad (12)$$

$$K = \frac{G_{\theta TL1}}{G_{PID} \cdot G_{\theta 1}} \cdot \frac{T_L}{V} \quad (13)$$

where $G_{\theta TL1}$ denotes a transfer function of disturbance $T_L$.

Equations (2) and (3) in the case of the prior art voltage drive and Equations (9) and (10) in the case of the negative impedance drive according to the invention are compared and studied.

First, if the frequency components of both control input voltage $V_1$, and disturbances $T_L$ lie in a low frequency region including a direct current, i.e. if Equation (14) is assumed to hold, $$\begin{cases} s^2 JL + s(JR + \mu L) + \mu R + KeKt \approx \mu R + KeKt \\ R + sL \approx R \end{cases} \quad (14)$$

Equations (2), (3), (9) and (10) can be rewritten into Equations $$\theta = \frac{1}{s} \cdot \frac{KtA_1}{\mu R + KeKt} V_1 + \frac{1}{s} \cdot \frac{R}{\mu R + KeKt} T_L \quad (15)$$

$$K = \frac{R}{KtA_1} \cdot \frac{T_L}{V_1} \quad (16)$$

$$\theta = \frac{1}{s} \cdot \frac{A_1}{Ke} V_1 + \frac{1}{s} \cdot \frac{sL}{KeKt} T_L \quad (17)$$

$$K \approx 0 \quad (18)$$

In a response to the control input voltage V1, the voltage drive defined in Equation (15) is subject to viscous friction since the coefficient μ remains in the denominator of the first term. However, in Equation (17) of the negative impedance drive, only the coefficient of counterelectromotive force $K_e$ remains and the coefficient μ can be ignored. Thus, the negative impedance drive is less subject to viscous friction to the control input voltage $V_1$. Further, in a response to the disturbances $T_L$, the component ratio K is a constant $(R/K_1 A_1)$ in Equation (16) of the voltage drive, but it is almost 0 in Equation (18) of the negative impedance drive. Accordingly, by adopting the negative impedance drive, the influence of the disturbances $T_L$ can be almost ignored, and resistance to the disturbances and linearity can be improved.

If Equations (11) to (13) are taken into account, it will be known that such characteristics are similarly seen during the servo control. By suitably combining the aforementioned P-control, I-control and/or D-control with the negative impedance drive system according to the object and purpose of the control, the control characteristics can be further improved.

In a comparison of $G_{\theta 1}$, $G_{\theta 2}$ of the respective first terms of the output angle θ of Equations (2) and (9), $G_{\theta 2}$ is not subject to the moment of inertia J of the actuator 5 and the operative device 6 in the term where $s^2$ is found in the denominator (s·s $\mu$L), and is not subject to the total of coefficients of viscous friction $\mu$ in the term where s is a denominator (s·$K_1K_t$). Accordingly, a more stable control can be performed.

Further, a damping coefficient $\zeta_\theta$ of $G_\theta$ in Equation (7) defining the output angle $\theta$ is expressed as in Equation (19).

$$\zeta_{G\theta} = \frac{J(R+Z_0) + \mu L}{2\sqrt{JL\{\mu(R+Z_0) + KeKt\}}} \quad (19)$$

According to Equation (19), the damping coefficient $\zeta_\theta$ can be set to 1 or a target value in order to make the characteristics of the servo control easier by operating the impedance $Z_0$. By doing this, a phase margin and a gain margin during the servo control can be ensured, and the control characteristics can be further improved by the increased servo band and feedback amount. Further, the circuit construction or design of the regulator 3 can be simplified, which in turn means an improvement in the transfer function G $\theta$.

Although the foregoing embodiment is described with respect to the case where the angle $\theta$ is controlled in response to the input V, the invention is also applicable to a case where the speed d $\theta$/dt is controlled.

In the foregoing embodiment, $Z_0+R=0$ is assumed. However, it is very difficult to hold this sum at 0 because of the stability of the negative impedance circuit. If this sum were to become negative, the circuit would be brought into an oscillating state and would not perform its original function. Accordingly, $Z_0$ is normally set so as to satisfy $0<Z_0+R<R$. For example, $Z_0$ is set: $0<Z_0+R<0.2R(Z_0=-0.8R)$. In this case, the effect of the invention continuously increases as $Z_0+R$ approximates to 0 from the value R.

Further, although the foregoing embodiment is described with respect to the case where the voice coil motor is adopted as the actuator 5, the invention is basically applicable to any construction in which an armature coil exists and a counterelectromotive force is generated in the coil according to the output of the actuator 5.

Furthermore, a servo controller of the present invention may be used in a dynamic speaker including a movable member to be moved by a voice coil motor and connected with a stationary member by way of a resilient member having a spring constant to prevent a shift with respect to the stationary member. In this case, the spring constant of the resilient member is included in a negative impedance circuit of a driver of the servo motor.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A servo controller for servo-controlling an operative device, the servo controller comprising:
    an actuator which includes a motor and actuates the operative device;
    a sensor which detects an operational state of the operative device;
    a comparator which receives the detected operational state of the operative device from the sensor and compares the detected operational state with a target operational state to produce a control signal; and
    a driver which is provided between the actuator and the comparator to drive the actuator in accordance with the control signal, the driver including a negative impedance circuit with respect to the actuator.

2. A servo controller for servo-controlling an operative device, the servo controller comprising:
    an actuator which includes a motor and actuates the operative device;
    a sensor which detects an operational state of the operative device;
    a comparator which receives the detected operational state of the operative device from the sensor and compares the detected operational state with a target operational state to produce a control signal; and
    a driver which is provided between the actuator and the comparator to drive the actuator in accordance with the control signal, the driver including a negative impedance circuit with respect to the actuator, wherein a negative impedance $Z_0$ of the negative impedance circuit is defined by an equation as follows:

$Z_0+R\approx 0$ where R denotes a resistance of the motor.

3. A servo controller as defined in claim 2, wherein the motor is a direct current motor.

4. A servo controller for servo-controlling an operative device, the servo controller comprising:
    an actuator which includes a direct current motor and actuates the operative device;
    a sensor which detects an operational state of the operative device;
    a comparator which receives the detected operational state of the operative device from the sensor and compares the detected operational state with a target operational state to produce a control signal; and
    a driver which is provided between the actuator and the comparator to drive the actuator in accordance with the control signal, the driver including a negative impedance circuit with respect to the actuator, wherein the driver outputs a drive signal $V_o$ an equation as follows:

$$V_0 = \frac{1}{s} \cdot \frac{KtA_1}{s^2JL + s\mu L + KeKt} V_1 + \frac{1}{s} \cdot \frac{sL}{s^2JL + s\mu L + KeKt} T_L$$

Where V1: the control signal from the comparator;
    s: Laplace operand
    J: a total of moments of inertia of the DC motor and a load
    $\mu$: a total of coefficients of viscous friction of the DC motor and the load
    L: inductance of an DC motor armature
    $K_e$: coefficient of counterelectromotive force
    $K_t$: torque constant
    $A_1$: voltage gain of the driver.

5. A servo controller for servo-controlling an operative device, the servo controller comprising:
    an actuator for actuating the operative device;
    a driver for generating a drive signal to drive the actuator, the driver including a negative impedance circuit with respect to the actuator, wherein a negative impedance $Z_0$ of the negative impedance circuit is defined by an equation as follows:

$Z_0+R\approx 0$ where R denotes a resistance of the motor;

a sensor for detecting an operational state of the operative device to produce a detection signal indicative of the operational state;

a comparator for receiving a target signal indicative of a target operational state and the detection signal from the sensor, and comparing the detection signal with the target signal; and a regulator for generating a control signal to the driver based on a result of the comparator.

6. A servo controller as defined in claim 5, wherein the actuator includes a direct current motor.

7. A servo controller as defined in claim 6, wherein the operative device includes a transmission mechanism and a drive member, and the transmission mechanism transmits a drive force from the direct current motor to the drive member.

8. A servo controller as defined in claim 7, wherein the transmission mechanism includes a gear system and the drive member includes a taking lens.

9. A servo controller as defined in claim 5, wherein the sensor detects an operational speed and an operational position of the operative device, and the target signal is indicative of a target speed and a target position of the operative device.

10. A servo controller as defined in claim 5, wherein the regulator generates a control signal to cause a difference between a detection signal from the sensor and the target signal to be zero.

11. A servo controller as defined in claim 1, wherein the operative device includes a transmission mechanism and a drive member, and the transmission mechanism transmits a drive force from the motor to the drive member.

12. A servo controller as defined in claim 11, wherein the transmission mechanism includes a gear system and the drive member includes a taking lens.

13. A servo controller for servo-controlling an operative device, the servo controller comprising:

an actuator which includes a motor and actuates the operative device;

a sensor which detects an operational state of the operative device;

a comparator which receives the detected operational state of the operative device from the sensor and compares the detected operational state with a target operational state to produce a control signal; and a driver which is provided between the actuator and the comparator to drive the actuator in accordance with the control signal, the driver including a negative impedance circuit with respect to the actuator, wherein a negative impedance $Z_0$ of the negative impedance circuit is defined by an equation as follows:

$$0 < Z_0 + R < R$$

where R denotes a resistance of the motor.

14. A servo controller for servo-controlling an operative device, the servo controller comprising:

an actuator for actuating the operative device;

a driver for generating a drive signal to drive the actuator, the driver including a negative impedance circuit with respect to the actuator, wherein a negative impedance $Z_0$ of the negative impedance circuit is defined by an equation as follows:

$$0 < Z_0 + R < R$$

where R denotes a resistance of the motor;

a sensor for detecting an operational state of the operative device to produce a detection signal indicative of the operational state;

a comparator for receiving a target signal indicative of a target operational state and the detection signal from the sensor, and comparing the detection signal with the target signal; and a regulator for generating a control signal to the driver based on a result of the comparator.

* * * * *

UNITED STATES PATENT AND TRADEMARK OFFICE
CERTIFICATE OF CORRECTION

PATENT NO. : 5,814,962
DATED : September 29, 1998
INVENTOR(S) : Mizumoto

It is certified that error appears in the above-identified patent and that said Letters Patent is hereby corrected as shown below:

Claim 4, line 15, after "$V_0$" insert --defined by--.

Signed and Sealed this

Second Day of May, 2000

Q. TODD DICKINSON

*Attest:*

*Attesting Officer*          *Director of Patents and Trademarks*